United States Patent
Cottet

(10) Patent No.: US 11,319,060 B2
(45) Date of Patent: May 3, 2022

(54) PIVOTING MAIN LANDING GEAR FOR CARGO AIRCRAFT

(71) Applicant: The Boeing Company, Chicago, IL (US)

(72) Inventor: Justin Duane Cottet, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 171 days.

(21) Appl. No.: 16/405,763

(22) Filed: May 7, 2019

(65) Prior Publication Data
US 2020/0354044 A1 Nov. 12, 2020

(51) Int. Cl.
*B64C 25/18* (2006.01)
*B64C 25/60* (2006.01)

(52) U.S. Cl.
CPC .............. *B64C 25/18* (2013.01); *B64C 25/60* (2013.01)

(58) Field of Classification Search
CPC ......... B64C 25/18; B64C 25/10; B64C 25/60; B64C 25/62; B64C 25/58; B64C 25/26; B64C 25/28; B64C 25/14; B64C 25/20; B64C 25/22
See application file for complete search history.

(56) References Cited

U.S. PATENT DOCUMENTS

| | | | | |
|---|---|---|---|---|
| 2,405,918 A | * | 8/1946 | Watter | B64C 25/14 244/119 |
| 3,088,699 A | * | 5/1963 | Larson | B64C 25/10 244/102 R |
| 3,687,400 A | * | 8/1972 | Fitzgerald | B64C 25/34 244/102 R |
| 3,904,153 A | * | 9/1975 | Watts | B64C 25/50 244/50 |
| 4,768,738 A | * | 9/1988 | Weinert | H01L 51/42 244/53 R |
| 6,173,920 B1 | * | 1/2001 | Meneghetti | B64C 25/34 244/100 R |
| 6,651,931 B1 | * | 11/2003 | Fox | B64C 25/12 244/104 R |
| 8,028,956 B2 | * | 10/2011 | Chow | B64C 25/16 244/102 R |
| 2005/0178900 A1 | * | 8/2005 | Quayle | B64C 25/14 244/102 R |
| 2009/0159743 A1 | * | 6/2009 | Guering | B64C 25/16 244/102 R |
| 2009/0321560 A1 | * | 12/2009 | Luce | B64C 25/14 244/102 R |

(Continued)

*Primary Examiner* — Joshua J Michener
*Assistant Examiner* — Colin Zohoori
(74) *Attorney, Agent, or Firm* — Duft & Bornsen, PC

(57) ABSTRACT

Systems and methods for pivoting main landing gear of a cargo aircraft. One embodiment is a main landing gear of an aircraft that includes a shock strut coupled to a truck with one or more wheels, and a trunnion coupled to a bulkhead and configured to pivotally couple the shock strut with the bulkhead. The main landing gear also includes a folding brace extending from the shock strut in a forward direction toward a nose of the aircraft and configured to stabilize the shock strut. The main landing gear further includes a retraction actuator configured to pivot the shock strut about the trunnion to retract the one or more wheels in the forward direction toward the nose and up toward a fuselage of the aircraft.

20 Claims, 9 Drawing Sheets

(56) References Cited

U.S. PATENT DOCUMENTS

| | | | | |
|---|---|---|---|---|
| 2012/0080559 A1* | 4/2012 | Keller | ................... | B64C 25/20 |
| | | | | 244/102 A |
| 2014/0197277 A1* | 7/2014 | Otto | ..................... | B64C 25/20 |
| | | | | 244/119 |
| 2019/0144104 A1* | 5/2019 | Fortier | .................. | B64C 25/14 |
| | | | | 244/102 R |
| 2019/0241256 A1* | 8/2019 | Moine | ................... | B64C 25/26 |
| 2019/0283867 A1* | 9/2019 | Euzet | ................... | B64C 25/26 |
| 2020/0354041 A1* | 11/2020 | Cottet | .................. | B64C 25/34 |
| 2020/0354042 A1* | 11/2020 | Schmidt | ............... | B64C 25/14 |
| 2020/0354043 A1* | 11/2020 | Cottet | .................. | B64C 25/14 |

\* cited by examiner

PIVOTING MAIN LANDING GEAR FOR CARGO AIRCRAFT

FIELD

This disclosure relates to the field of aircraft and, in particular, to landing gear for an aircraft.

BACKGROUND

Aircraft landing gears may retract during flight and extend for landing. A typical aircraft includes a wheel well that houses the landing gear during flight to reduce aerodynamic drag. However, some aircraft, such as cargo aircraft, may not include a wheel well in order to maximize interior space for cargo. Cargo aircraft also sometimes include high wings on an upper portion of the fuselage to maximize cargo space. With high wings, the landing gear is typically mounted to the fuselage. With the wings and wing-mounted engines higher off the ground, the center of gravity of the aircraft is higher as compared to a passenger aircraft. Furthermore, a cargo aircraft may have low ground clearance to facilitate loading and unloading cargo onto the cargo floor of the aircraft. Therefore, it would be desirable to have a landing gear arrangement for a cargo aircraft that takes into account these considerations.

SUMMARY

Embodiments described herein provide for a pivoting main landing gear for a cargo aircraft. The landing gear folds into a retracted position outside the fuselage for maximizing cargo space. Additionally, in the retracted position, the landing gear has a compact size with minimal frontal area to reduce aerodynamic drag. The configuration of the main landing gear also allows for increased stability of the aircraft, and in particular, improved ground stability for cargo aircraft that have high wings, a high center of gravity, and heavy cargo loads.

One embodiment is a main landing gear of an aircraft that includes a shock strut coupled to a truck with one or more wheels, and a trunnion coupled to a bulkhead and configured to pivotally couple the shock strut with the bulkhead. The main landing gear also includes a folding brace extending from the shock strut in a forward direction toward a nose of the aircraft and configured to stabilize the shock strut. The main landing gear further includes a retraction actuator configured to pivot the shock strut about the trunnion to retract the one or more wheels in the forward direction toward the nose and up toward a fuselage of the aircraft.

Another embodiment is a method of retracting a main landing gear of an aircraft. The method includes mounting a trunnion on an aft side of a shock strut, the shock strut attached with a truck having one or more main wheels, pivotally coupling the shock strut with a bulkhead of a fuselage of the aircraft by attaching the trunnion to the bulkhead, and attaching a folding brace to the shock strut to project forward from the shock strut. The method also includes pivoting the shock strut via the trunnion in a direction forward from the bulkhead to retract the one or more main wheels forward toward a nose and up toward a fuselage of the aircraft.

Yet another embodiment is an aircraft that includes a pair of main landing gears. Each main landing gear includes a shock strut coupled to a truck with one or more wheels, a trunnion coupled to a bulkhead and configured to pivotally couple the shock strut with the bulkhead, and a folding brace extending from the shock strut in a forward direction toward a nose of the aircraft and configured to stabilize the shock strut. Each main landing gear also includes a retraction actuator configured to pivot the shock strut about the trunnion to retract the one or more wheels in the forward direction toward the nose and up toward a fuselage of the aircraft.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
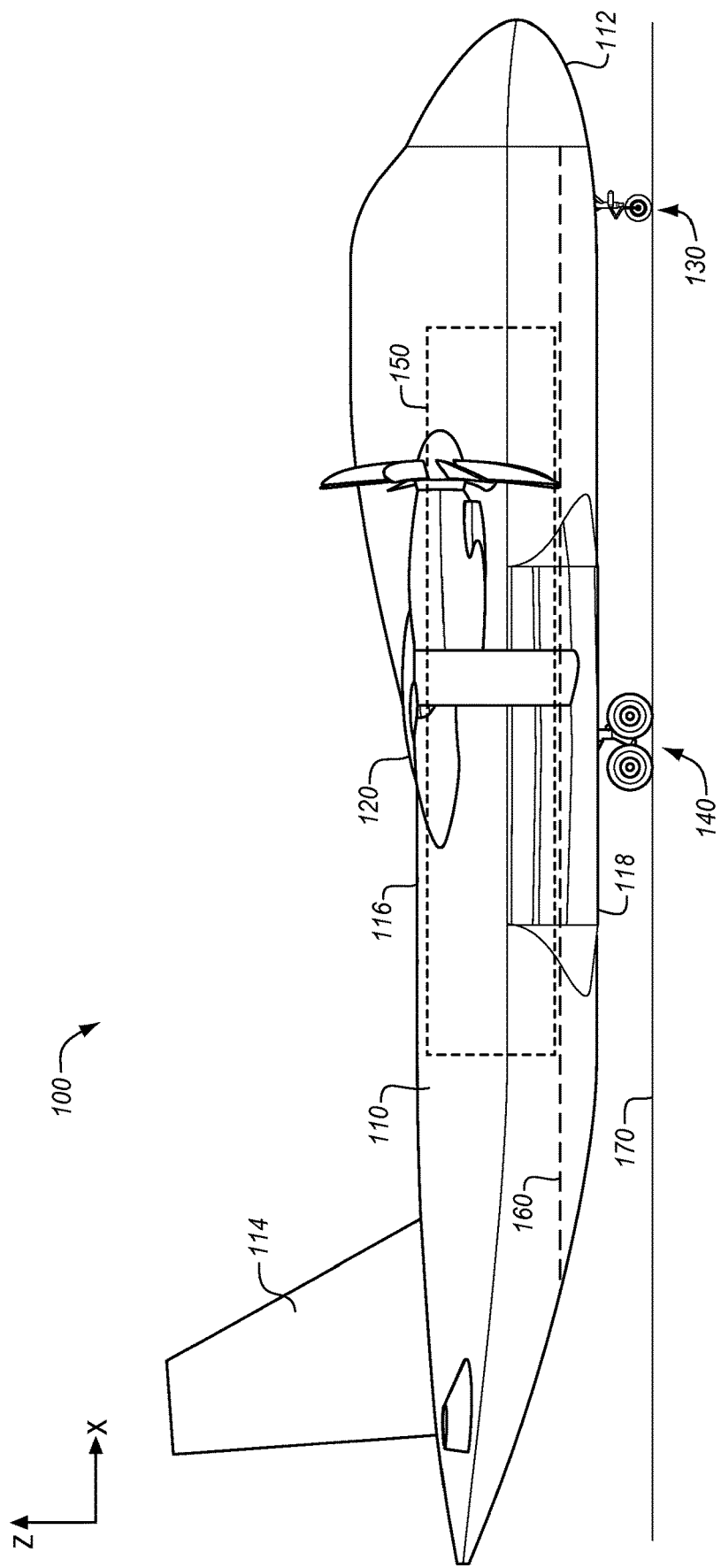
FIG. 1 is a side view of an aircraft in an illustrative embodiment.

FIG. 1 is a side view of an aircraft 100 in an illustrative embodiment. The aircraft 100 includes a fuselage 110 including a nose 112, and also includes a tail 114. The aircraft 100 also includes wings 120, nose landing gear 130, and main landing gear 140. As described in greater detail below, the aircraft 100 is enhanced with the main landing gear 140 configured to provide increased interior space of the fuselage 110, increased ground stability, and reduced aerodynamic drag. The main landing gear 140 is also able to extend without hydraulics using gravity and aerodynamic drag.

Features of the main landing gear 140 may be applicable in embodiments in which the aircraft 100 is a cargo aircraft. For example, as shown in FIG. 1, the aircraft 100 may include a high-wing configuration in which the wings 120 attach at or near a top 116 of the fuselage 110 to maximize interior space of the fuselage 110 for cargo 150, such as a shipping container. The aircraft 100 may also exclude a wheel well to maximize interior space of the fuselage 110. Additionally, the aircraft 100 may include a cargo floor 160 extending longitudinally the fuselage 110 to support the cargo 150. The aircraft 100 may have a low-deck configuration in which a height from the ground 170 to a belly 118 of the fuselage 110 or the cargo floor 160 is low for easier loading and unloading of the cargo 150. It will be appreciated, however, that the features and functions of the main landing gear 140 described in greater detail below may apply to alternative aircraft having some combination of cargo carrying features described above or no such features.

Figure 2:
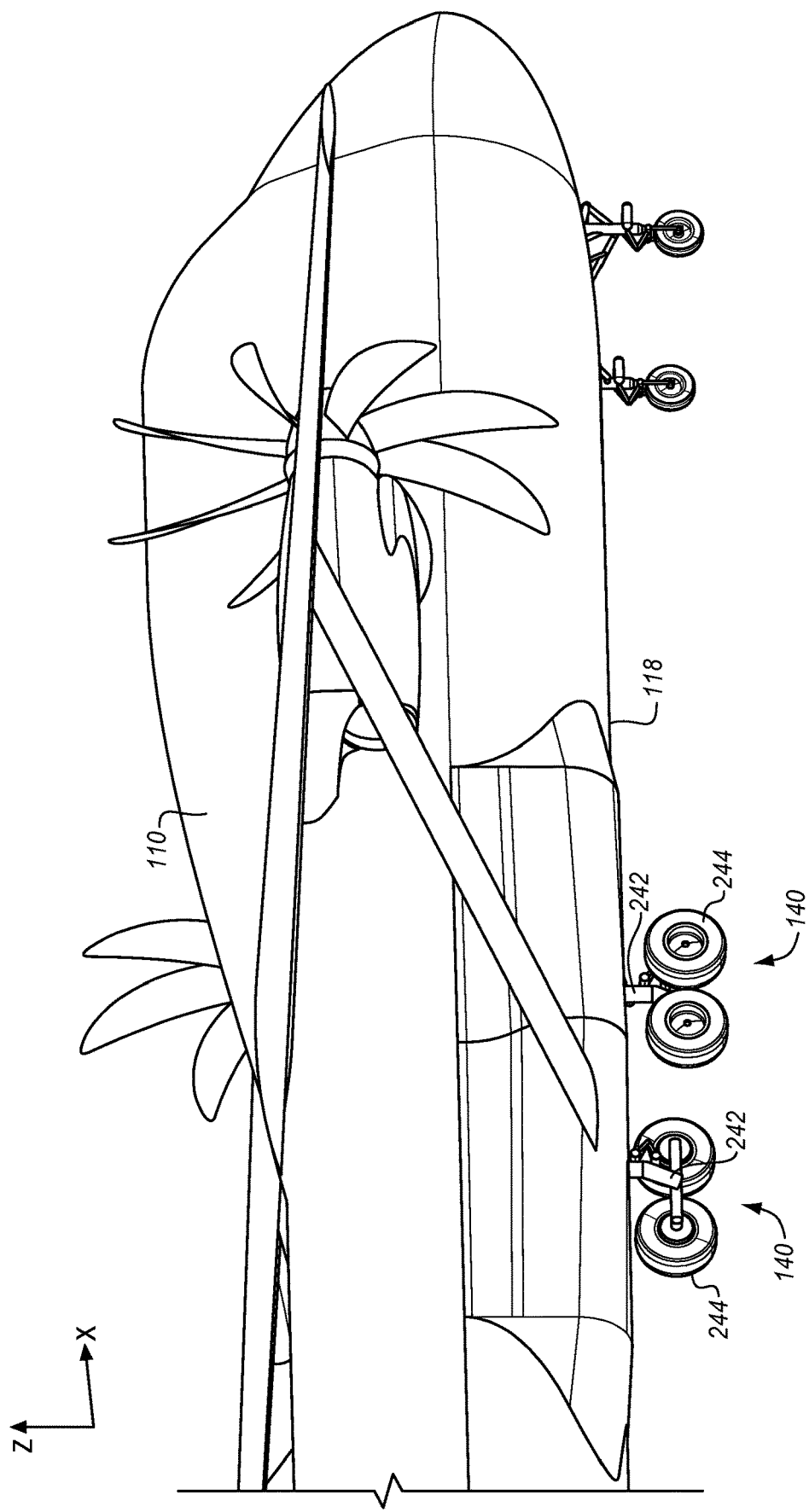
FIG. 2 is a perspective side view of the aircraft in an illustrative embodiment.

FIG. 2 is a perspective side view of the aircraft 100 in an illustrative embodiment. As shown in FIG. 2, the aircraft 100 may include a pair of nose landing gears and a pair of main landing gears 140. Generally, the nose landing gears support the fuselage 110 at a position toward the nose 112, and the main landing gears 140 support the fuselage 110 at a position aft of the nose landing gears, toward a middle section between the nose 112 and the tail 114. The pair of main landing gears 140 may include a pair of posts 242 disposed across the fuselage 110. The pair of posts 242 may generally straddle a center line extending longitudinally along the belly 118 of the fuselage 110. Each post 242 has one or more main wheels 244 rotatably attached thereto. Additional details of the function and structure of the main landing gears 140 are described in greater detail below.

Figure 3:
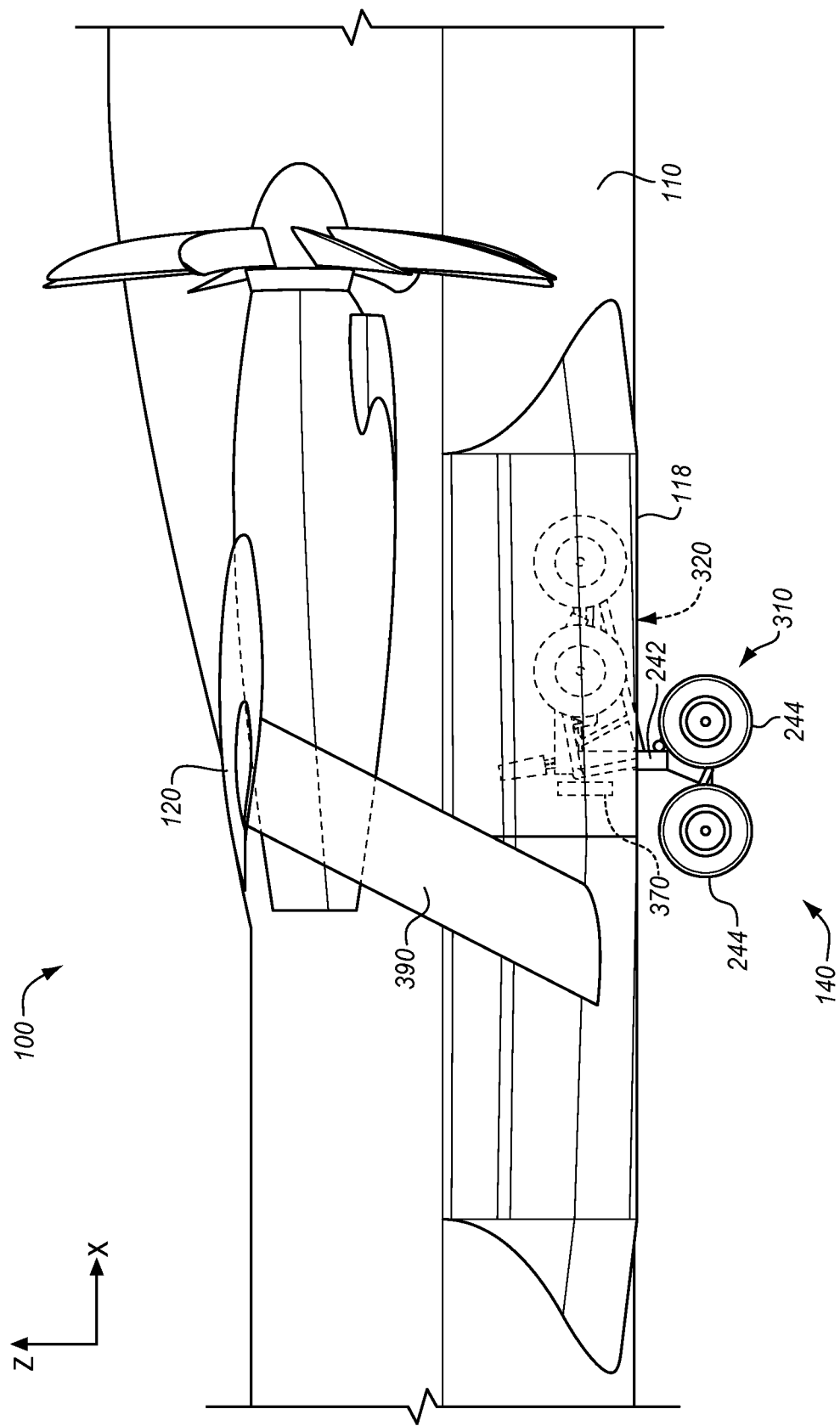
FIG. 3 is a side view of the main landing gear of the aircraft in an illustrative embodiment.

FIG. 3 is a side view of the main landing gear 140 of the aircraft 100 in an illustrative embodiment. Each main landing gear 140 is configured to pivot forward (e.g., toward the nose 112 or in the x-direction) to retract. In particular, from an extended position 310 where the main landing gear 140 supports the aircraft 100 on the ground 170, the main landing gear 140 pivots forward to a retracted position 320 where the main wheels 244 tuck against the side of the fuselage 110. Portions of the post 242 and/or main wheels 244 protruding from the fuselage 110 is minimal in the retracted position 320 to reduce or minimize aerodynamic drag. Additionally, since the main landing gears 140 retract forward, each main landing gear 140 is configured to extend the post 242 to the extended position 310 via gravity and aerodynamic drag. For example, in the event of a hydraulic or power failure of the aircraft 100, each main landing gear 140 is able to reach the extended position 310 for landing by being lowered from gravitational pull on its weight and being pushed backward by air as the aircraft 100 travels forward. In one embodiment, each post 242 includes at least two main wheels 244 arranged in tandem longitudinally (e.g., along the x-direction) of the aircraft 100, as shown in FIG. 3. The forward retraction and tandem arrangement of the main wheels 244 advantageously minimizes the front profile of the main landing gears 140 in the retracted position 320 to minimize aerodynamic drag in the absence of a wheel well.

Additionally, FIG. 3 shows the main landing gear 140 integrated with a bulkhead 370 and a wing support sponson 390. The wing support sponson 390 may include a support beam extending between a bottom of the wing 120 and a side of the fuselage 110 to provide structural support of the wing 120 for a high-wing configuration of the aircraft 100. The wing support sponson 390 may attach to the side of the fuselage 110 by attaching directly or indirectly with the bulkhead 370 comprising a wall structure of the fuselage 110. In one embodiment, the main landing gear 140 attaches with the bulkhead 370 at a position forward from the bulkhead 370, as shown in FIG. 3. Compared with previous landing gear configurations that use multiple structural mounting locations, the main landing gear 140 advantageously enables simply supported forward retraction motion that integrates with existing aircraft structure for the wing support sponson 390.

Figure 4:
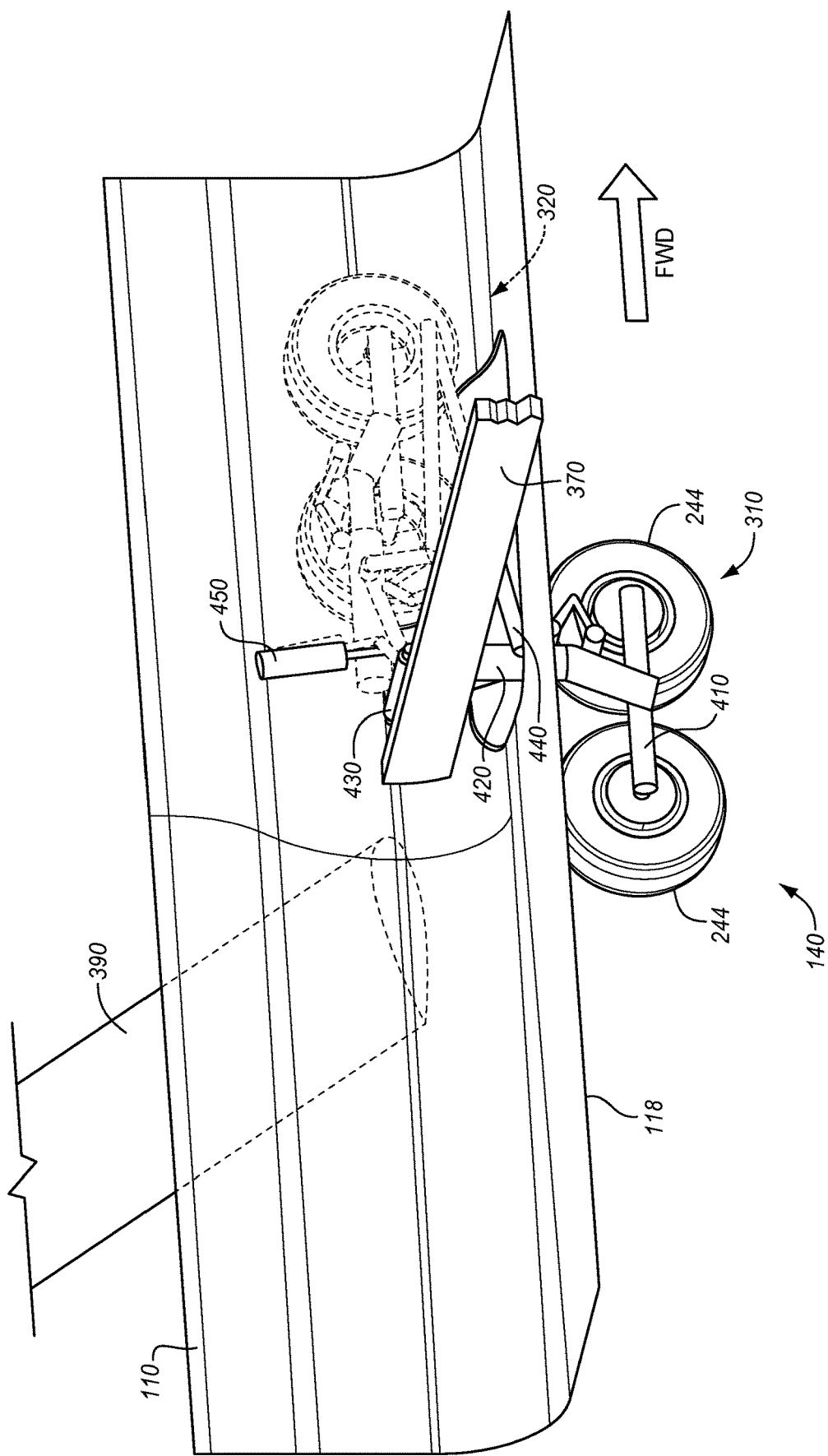
FIG. 4 is a side perspective view of the main landing gear in an illustrative embodiment

FIG. 4 is a side perspective view of the main landing gear 140 in an illustrative embodiment. The main landing gear 140 includes a truck 410 coupled with the main wheels 244, and a shock strut 420 coupled to the truck 410. The main landing gear 140 further includes a trunnion 430 coupled to the bulkhead 370 and configured to pivotally couple the shock strut 420 with the bulkhead 370. The trunnion 430 may comprise a joint structure, such as a shaft rotatably about bearings, to pivotally join the shock strut 420 with the bulkhead 370 or aircraft structure.

The main landing gear 140 also includes a folding brace 440 extending from the shock strut 420 in a forward direction toward the nose 112 of the aircraft 100. The folding brace 440 is configured to stabilize the shock strut 420 for landing and ground operation. Previous landing gear configurations include drag braces extending aft from the strut. The forward projection of the folding brace 440 advantageously enables preserving space aft of the shock strut 420 for the support structure of the trunnion 430 and the wing support sponson 390, thereby enabling forward retraction of the main landing gear 140 and integrating the pivot structure of the main landing gear 140 with structure of the wing support sponson 390.

Additionally, the main landing gear 140 includes a retraction actuator 450 configured to pivot the shock strut 420 about the trunnion 430 to retract the main wheels 244 in the forward direction toward the nose 112 and up toward the fuselage 110 of the aircraft 100. The configuration of the main landing gear 140 advantageously enables the structure to tuck closely with the belly 118 of the fuselage 110 and to reside outside the cargo volume of the aircraft 100 in the retracted position 320.

Figure 5:
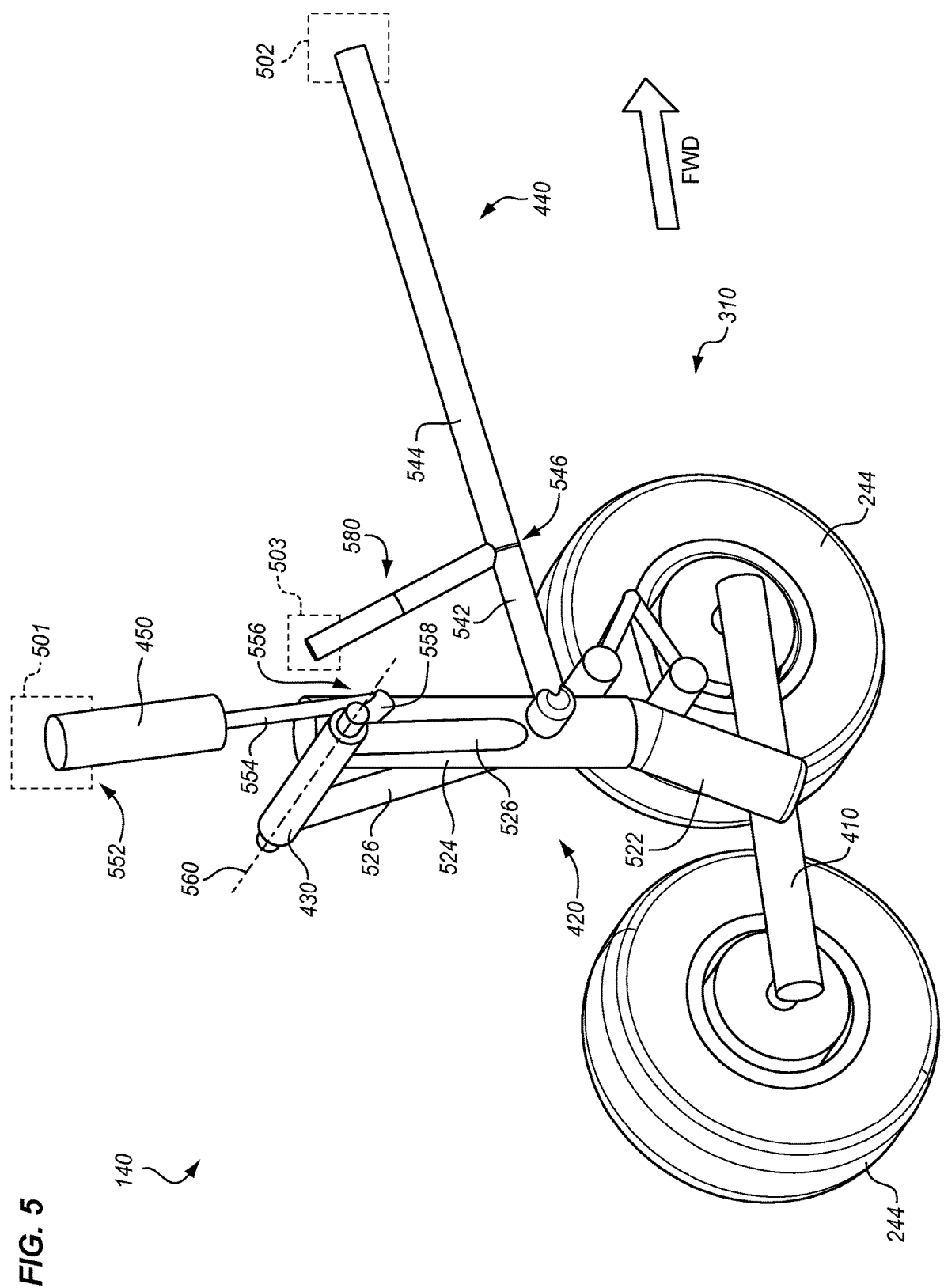
FIG. 5 is a side perspective view of the main landing gear in another illustrative embodiment.

FIG. 5 is a side perspective view of the main landing gear 140 in another illustrative embodiment. FIG. 5 illustrates the main landing gear 140 in the extended position 310. The shock strut 420 includes a bottom cylinder 522 coupled with the truck 410, and a top cylinder 524 that is telescopic with the bottom cylinder 522. The bottom cylinder 522 and the top cylinder 524 may also be referred to as inner cylinder and outer cylinder, respectively. Generally, the bottom cylinder 522 slides in the top cylinder 524, and the shock strut 420 uses hydraulic fluid to absorb and dissipate shock loads on landing.

The shock strut 420 includes one or more support arms 526 projecting aft of the shock strut 420 to support the trunnion 430. In one embodiment, the support arms 526 extend from the top cylinder 524 in a direction up toward the fuselage 110 and back toward the tail 114 relative to their attachment point on an aft side of the top cylinder 524. The support arms 526 may be v-shaped with the trunnion 430 extending between top ends of the support arms 526. The trunnion 430 may be supported on the support arms 526 and oriented with a rotational axis 560 that is transverse to a longitudinal direction of the fuselage 110 of the aircraft 100. As previously described, the trunnion 430 may be attached to the bulkhead 370 (not shown in FIG. 5).

Additionally, the main landing gear 140 is attached with the aircraft 100 at aircraft structure 501-503 representing fixed structural attachment points to the aircraft 100 and indicated by the dashed squares in FIG. 5. The retraction actuator 450 may include a headend 552, a rod 554, and a rod end 556. The headend 552 couples with aircraft structure 501, and the rod end 556 couples with a retraction horn 558 projecting from the trunnion 430. For example, the retraction horn 558 may project in a forward direction from the trunnion 430, and the retraction actuator 450 may couple with the retraction horn 558 at a position above the retraction horn 558. Accordingly, the retraction actuator 450 is configured to pull the rod 554 and the retraction horn 558 up (e.g., toward the belly 118) to apply torque to the trunnion 430 and swing the shock strut 420, truck 410, and main wheels 244 forward about the rotational axis 560 of the trunnion 430.

The folding brace 440 includes a first member 542 and a second member 544 connected via a hinge 546. The first member 542 attaches with the top cylinder 524 of the shock strut 420, and the second member 544 attaches with aircraft structure 502. With the main landing gear 140 in the extended position 310, the folding brace 440 is configured to straighten with the first member 542 and the second member 544 extending in a straight line between the shock strut 420 and aircraft structure 502. The straightened position of the folding brace 440 locks the first member 542 and the second member 544 together so that the main landing gear 140 is rigidly supported on the ground. In the extended position 310, the folding brace 440 may extend in a direction forward and up from its attachment point on the shock strut 420, as shown in FIG. 5. The hinge 546 allows the folding brace 440 to fold as the main landing gear 140 retracts toward the retracted position 320.

The main landing gear 140 includes lock links 580 coupled with the folding brace 440 and configured to stabilize the folding brace 440 when the main landing gear 140 is in the extended position 310. The lock links 580 may comprise a hinged structure configured to straighten over center to stabilize the folding brace 440 while the aircraft 100 is on the ground. Additionally, the lock links 580 are configured to hinge over center to allow the folding brace 440 to fold such that the main landing gear 140 may retract in an unimpeded forward motion. The configuration of the folding brace 440 advantageously enables the main landing gear 140 to be integrally supported by the structure of the wing support sponson 390 with the main landing gear 140 disposed outboard on the fuselage 110 for increased stability for cargo, while still enabling the main landing gear 140 to retract in a forward direction and closely to the fuselage 110 during flight for minimized aerodynamic drag.

Figure 6:
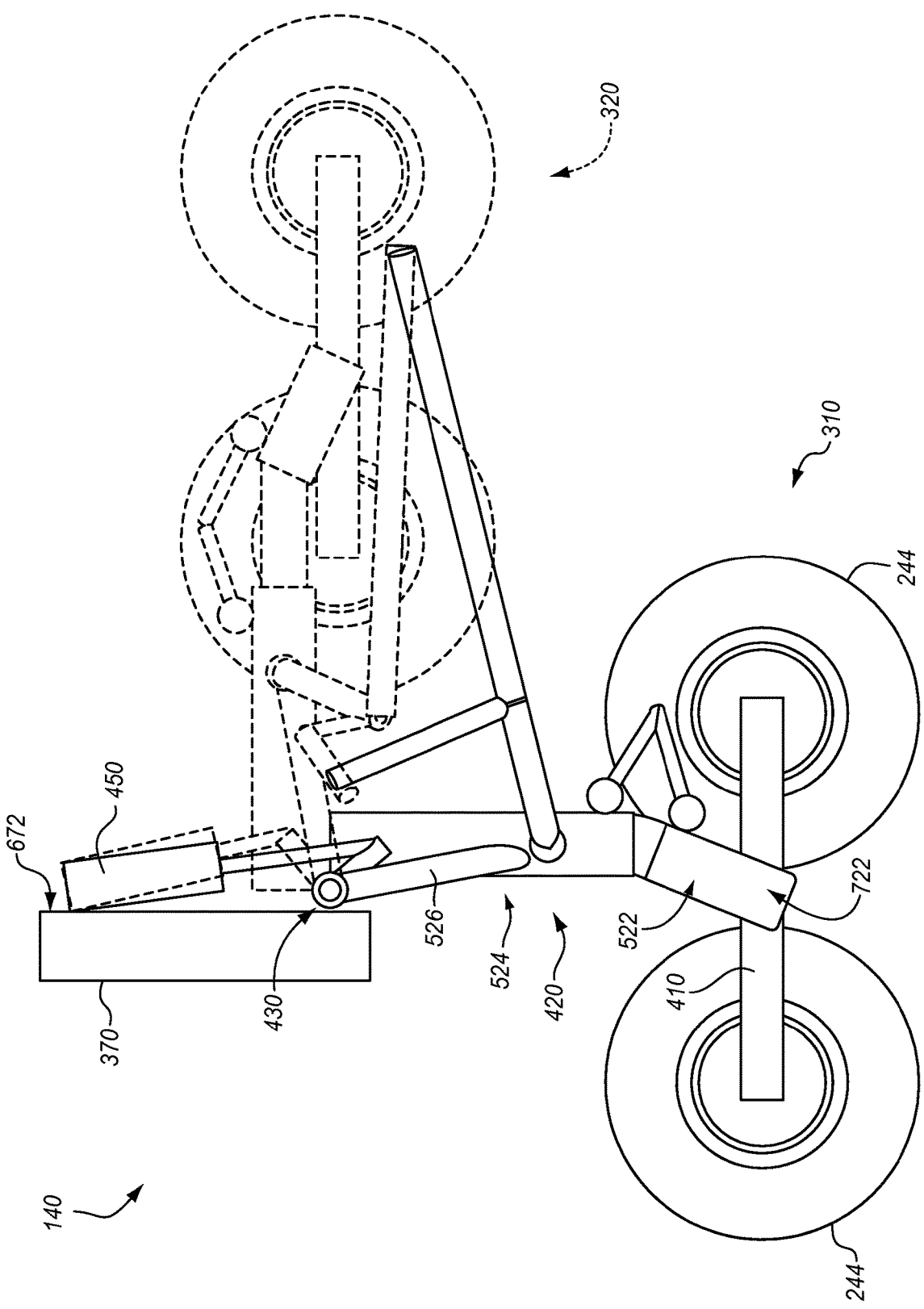
FIG. 6 is a side view of the main landing gear in a further illustrative embodiment.

FIG. 6 is a side view of the main landing gear 140 in a further illustrative embodiment. As shown in FIG. 6, the trunnion 430 is attached to a forward-facing wall 672 of the bulkhead 370, and is supported on the support arms 526 between the bulkhead 370 and the shock strut 420. Additionally, the bottom cylinder 522 includes a kinked fork 722 pivotally coupled with the truck 410 to provide clearance for the truck 410 when the main landing gear 140 in the retracted position 320. With the shock strut 420, truck 410, and main wheels 244 pivoted about the trunnion 430 forward and up, the main landing gear 140 is able to retract against the fuselage 110 into a compact size. The structure of the main landing gear 140 in the retracted position 320 is thus able to tuck closely against the sides of the fuselage 110. Additionally, the forward retraction and/or tandem arrangement of the main wheels 244 minimizes the front facing profile of the main landing gear 140 to reduce aerodynamic drag in the absence of a wheel well. Also, because the main wheels 244 retract forward, they are able to extend using only gravity and aerodynamic drag, allowing the aircraft 100 to prepare for landing even in instances for which a hydraulic failure has occurred.

Figure 7:
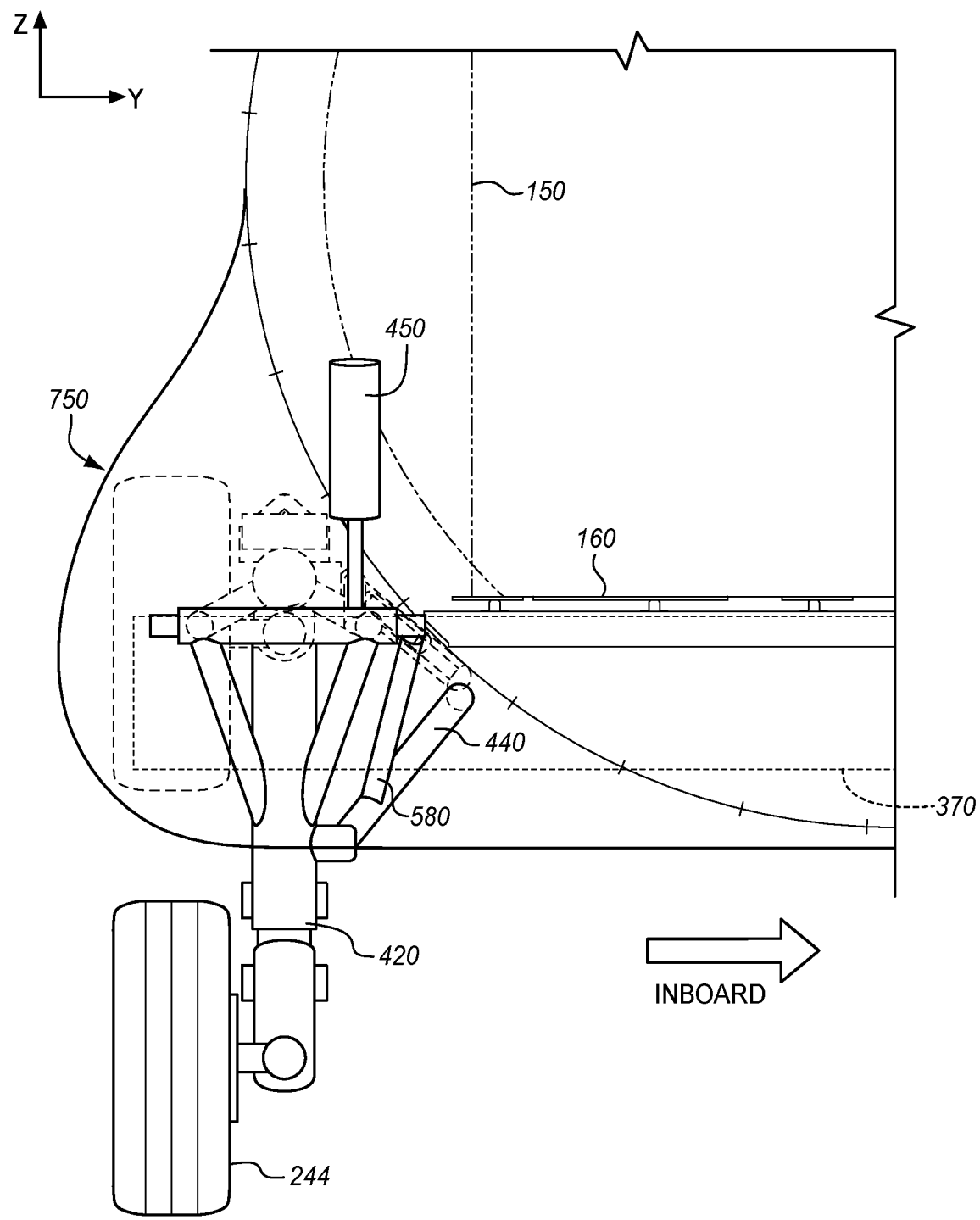
FIG. 7 is a rear view of the main landing gears of the aircraft in an illustrative embodiment.

FIG. 7 is a rear view of the main landing gears 140 of the aircraft 100 in an illustrative embodiment. FIG. 7 illustrates an example of how the main landing gear 140, using the configuration and structure previously described, may position relative to the aircraft 100 to provide features beneficial for carrying cargo 150. For example, as shown in FIG. 7, the structure of each main landing gear 140 may be disposed outboard from, or at/underneath outboard sides of, the cargo floor 160. For example, a distance between the main landing gears 140 (e.g., in the y-direction) may be larger than a width of the cargo floor 160. The wide stance configuration of the main landing gears 140 advantageously increases ground stability of the aircraft 100 to reduce tipping risk. The increased stability helps offset a higher center of gravity the aircraft 100 may have by incorporating a high-wing configuration that carries bulky cargo, such as shipping containers.

Additionally, as previously described, the forward retraction and tandem arrangement of the main wheels 244 advantageously minimizes the profile of body fairings 750 of the aircraft 100 to minimize aerodynamic drag in the absence of a wheel well. Still further, the retraction configuration of the main landing gears 140 eliminates structure directly underneath the belly 118, thereby enabling the belly 118 and the cargo floor 160 to be lower to the ground to increase ground stability and facilitate loading and unloading of the cargo 150. In some embodiments, the main landing gears 140 are configured to retract the main wheels 244 outboard from the cargo floor 160 with at least a portion of the main wheel(s) 244 at a same height higher than the cargo floor 160. This allows the body fairings 750 to be located more toward sides of the fuselage 110 to free up space near the belly 118 for low ground clearance configurations of the aircraft 100. Alternatively or additionally, the main landing gears 140 may be positioned along or proximate with a vertical tangent line to the sides of the fuselage 110 for efficient and stable carrying of cargo.

Figure 8:
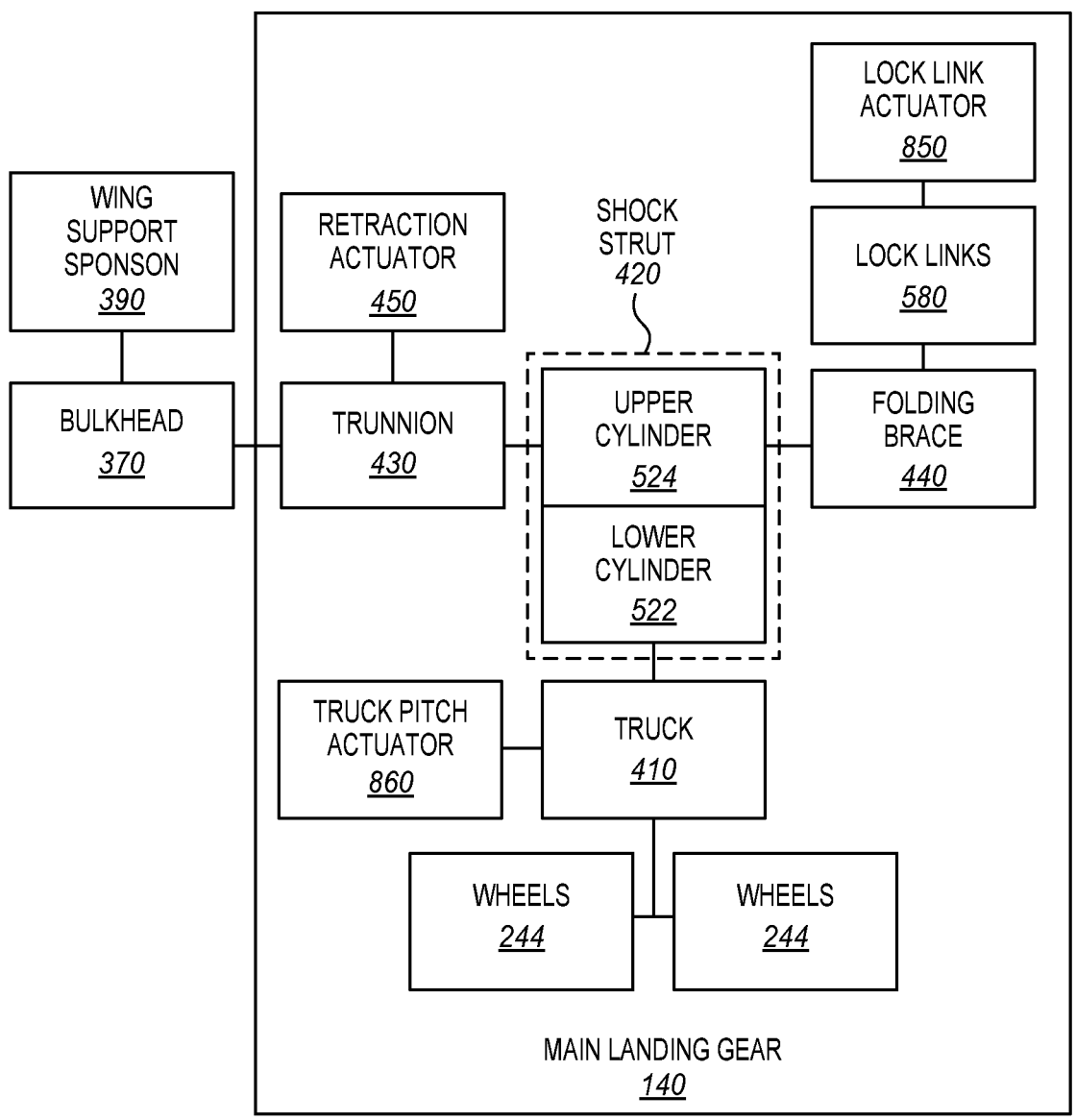
FIG. 8 is a block diagram of the main landing gear in an illustrative embodiment.

FIG. 8 is a block diagram of the main landing gear 140 in an illustrative embodiment. In addition to elements already described, the main landing gear 140 may further include a lock link actuator 850 configured to initiate the hinging motion of the lock links 580 from their straightened position. For instance, the lock link actuator 850 may push the lock links 580 over center to unlock the folding brace 440 and initiate retraction of the main landing gear 140. The main landing gear 140 may further include a truck pitch actuator 860 coupled with the truck 410 and configured to maintain a level orientation of the truck 410 during retraction/extension of the main landing gear 140.

Figure 9:
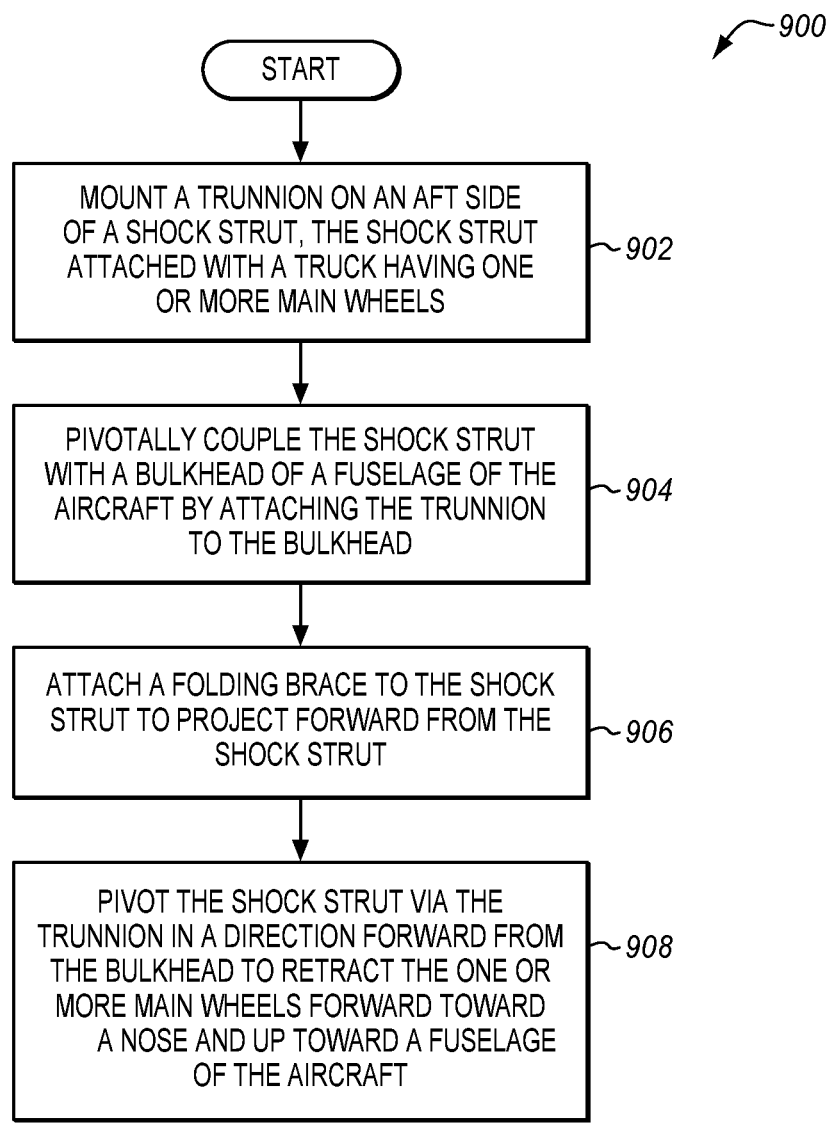
FIG. 9 is a flowchart illustrating a method for retracting the main landing gear in an illustrative embodiment.

FIG. 9 is a flowchart illustrating a method 900 for retracting the main landing gear 140 in an illustrative embodiment. The steps of the method 900 are described with reference to the main landing gear 140 and the aircraft 100 of FIGS. 1-8, but those skilled in the art will appreciate that method 900 may be performed with alternative main landing gear structures and aircraft. The steps of the flowcharts described herein are not all inclusive and may include other steps not shown. The steps described herein may also be performed in an alternative order.

In step 902, the trunnion 430 is mounted on an aft side of a shock strut 420, the shock strut 420 being attached with the truck 410 having one or more main wheels 244. In step 904, the shock strut 420 is pivotally coupled with the bulkhead 370 of the fuselage 110 of the aircraft 100 by attaching the trunnion 430 to the bulkhead 370. In step 906, the folding brace 440 is attached to the shock strut 420 to project forward from the shock strut 420. In step 908, the shock strut 420 pivots via the trunnion 430 in a direction forward from the bulkhead 370 to retract the one or more main wheels 244 forward toward the nose 112 and up toward the fuselage 110 of the aircraft 100.

Although specific embodiments were described herein, the scope is not limited to those specific embodiments. Rather, the scope is defined by the following claims and any equivalents thereof

What is claimed is:

1. A main landing gear of an aircraft comprising:
   a shock strut coupled to a truck with one or more wheels;
   a trunnion pivotally connected to a bulkhead of a fuselage of the aircraft and configured to pivotally couple the shock strut with the bulkhead while attached to a forward-facing wall of the bulkhead;
   a folding brace extending from the shock strut in a forward direction toward a nose of the aircraft and configured to stabilize the shock strut; and
   a retraction actuator, disposed directly above the trunnion, configured to pivot the shock strut about the trunnion to retract the one or more wheels in the forward direction toward the nose and up toward the fuselage of the aircraft,
   wherein the retraction actuator is directly coupled with a retraction horn of the trunnion that projects in a forward direction, and is configured to retract a rod to apply torque directly to the retraction horn of the trunnion, and
   the forward-facing wall of the bulkhead of the fuselage and a rear-facing wall of the bulkhead of the fuselage are both within a same compartment at a body fairing of the aircraft.

2. The main landing gear of claim 1 wherein:
   the shock strut includes support arms projecting in an aft direction when the main landing gear is in an extended position, and
   the trunnion is supported on the support arms between the bulkhead and the shock strut.

3. The main landing gear of claim 1 wherein:
   the folding brace is configured to lock.

4. The main landing gear of claim 1 wherein:
   the bulkhead is attached with a wing support sponson of the aircraft, and
   the shock strut pivots from the bulkhead in the forward direction.

5. The main landing gear of claim 1 wherein:
   the folding brace is configured to straighten with the main landing gear in an extended position, and to fold as the main landing gear retracts from the extended position toward a retracted position.

6. The main landing gear of claim 5 wherein:
   the shock strut includes a bottom cylinder coupled with the truck, and a top cylinder that is telescopic with the bottom cylinder, and
   the bottom cylinder includes a kinked fork pivotally coupled with the truck to provide clearance for the truck when the main landing gear is in the retracted position.

7. The main landing gear of claim 5 further comprising:
   lock links coupled with the folding brace and configured to stabilize the folding brace when the main landing gear is in the extended position.

8. A method of retracting a main landing gear of an aircraft, the method comprising:
   mounting a trunnion on an aft side of a shock strut, the shock strut attached with a truck having one or more main wheels;
   pivotally coupling the shock strut with a bulkhead of a fuselage of the aircraft by pivotally attaching the trunnion to a forward-facing wall of the bulkhead;
   attaching a folding brace to the shock strut to project forward from the shock strut; and
   pivoting the shock strut via the trunnion, by operation of a retraction actuator disposed directly above the trunnion, in a direction forward from the bulkhead to retract the one or more main wheels forward toward a nose and up toward a fuselage of the aircraft,
   wherein the retraction actuator is directly coupled with a retraction horn of the trunnion that projects in a forward direction, and is configured to retract a rod to apply torque directly to the retraction horn of the trunnion, and
   the forward-facing wall of the bulkhead of the fuselage and a rear-facing wall of the bulkhead of the fuselage are both within a same compartment at a body fairing of the aircraft.

9. The method of claim 8 further comprising:
   locking the folding brace.

10. The method of claim 8 further comprising:
    positioning the trunnion between the bulkhead and the shock strut, the trunnion oriented with a rotational axis that is transverse to a longitudinal direction of the fuselage of the aircraft.

11. The method of claim 10 further comprising:
    mounting the trunnion to the shock strut via support arms projecting backward and up from the shock strut when the main landing gear is in an extended position.

12. The method of claim 8 further comprising:
    maintaining a level orientation of the truck attached to the shock strut during retraction of the main landing gear.

13. The method of claim 8 further comprising
    unlocking lock links coupled to the folding brace to initiate folding of the folding brace for retracting the main landing gear.

14. An aircraft comprising:
    a pair of main landing gears, each main landing gear comprising:
       a shock strut coupled to a truck with one or more wheels;
       a trunnion pivotally connected to a forward-facing wall of a bulkhead of a fuselage of the aircraft and configured to pivotally couple the shock strut with the bulkhead;
       a folding brace extending from the shock strut in a forward direction toward a nose of the aircraft and configured to stabilize the shock strut; and
       a retraction actuator, disposed directly above the trunnion, configured to pivot the shock strut about the trunnion to retract the one or more wheels in the forward direction toward the nose and up toward the fuselage of the aircraft, wherein the retraction actuator is directly coupled with a retraction horn of the trunnion that projects in a forward direction, and is configured to retract a rod to apply torque directly to the retraction horn of the trunnion, and
       the forward-facing wall of the bulkhead of the fuselage and a rear-facing wall of the bulkhead of the fuselage are both within a same compartment at a body fairing of the aircraft.

15. The aircraft of claim 14, wherein:
the shock strut includes support arms projecting in an aft direction when the main landing gear is in an extended position, and
the trunnion is supported on the support arms between the bulkhead and the shock strut.

16. The aircraft of claim 14, wherein:
the folding brace is configured to lock.

17. The aircraft of claim 14 wherein:
the bulkhead is attached with a wing support sponson of the aircraft, and
the shock strut pivots from the bulkhead in the forward direction.

18. The aircraft of claim 14 wherein each of the main landing gear further includes:
the folding brace is configured to straighten with the main landing gear in an extended position, and to fold as the main landing gear retracts from the extended position toward a retracted position.

19. The aircraft of claim 14 further comprising:
a body fairing to cover one of the main landing gears in a retracted position; and
a wing support sponson extending between a wing and the fuselage.

20. The aircraft of claim 14 wherein:
the aircraft is a cargo aircraft.

* * * * *